(12) United States Patent
Stephens

(10) Patent No.: US 6,393,285 B1
(45) Date of Patent: May 21, 2002

(54) METHOD OF AND SYSTEM FOR DYNAMICALLY REGISTERING AND PAGING MOBILE UNITS IN A WIRELESS SYSTEM

(75) Inventor: Gary Boyd Stephens, Richardson, TX (US)

(73) Assignee: Nortel Networks Limited, St. Laurent ( * ) Notice: Subject to any disclaimer, the term of this patent is extended or adjusted under 35 U.S.C. 154(b) by 0 days.

(21) Appl. No.: 09/321,396

(22) Filed: May 28, 1999

(51) Int. Cl.[7] .................................................. H04Q 7/20
(52) U.S. Cl. ........................ 455/435; 455/405; 455/432
(58) Field of Search ................................. 455/405, 435, 455/422, 432, 517

(56) References Cited

U.S. PATENT DOCUMENTS 5,588,043 A * 12/1996 Tiedemann .................. 455/435
5,710,972 A * 1/1998 Lin ............................. 455/525
6,138,018 A * 10/2000 Pashtan ....................... 455/435

OTHER PUBLICATIONS

Compaq Digital Products and Services, *GSM: Overview and Principals*, Customised and Advanced Technology Computing, Apr. 22, 1999.

* cited by examiner

Primary Examiner—Vivian Chang
Assistant Examiner—James K Moore
(74) Attorney, Agent, or Firm—John D. Crane; Bracewell & Patterson, L.L.P.

(57) ABSTRACT

A method of and system for dynamically managing the registration and paging mobile units in a wireless system monitors a usage pattern for each mobile unit in the wireless system. Based upon the monitored usage pattern, the system sets a registration plan and a paging area plan for each mobile unit.

16 Claims, 3 Drawing Sheets

METHOD OF AND SYSTEM FOR DYNAMICALLY REGISTERING AND PAGING MOBILE UNITS IN A WIRELESS SYSTEM

FIELD OF THE INVENTION

The present invention relates generally to the field of wireless telecommunications, and more particularly to a method of and system for dynamically managing the paging and registration of mobile units in a wireless system based upon usage patterns.

DESCRIPTION OF THE PRIOR ART

Wireless services are being developed to serve a variety of telecommunications markets. These markets include paging, analog cellular, digital cellular, personal communications services, and general packet radio service (GPRS). The number of subscribers using these services is growing at a tremendous rate.

Wireless systems include an infrastructure of switching centers and base stations. Calls are delivered from switching centers to the base stations by wire or fiber optic links, and from the base stations to mobile units via radio links. Because of the mobility of mobile units, it is necessary to know at least generally where in the system a mobile unit is located at a particular time, and to know more precisely where the mobile unit is located when it is necessary to deliver a call to the mobile unit.

In order to keep track of the location of mobile units, all mobile units are typically required to register with a serving mobile switching center. When a mobile switching center receives a call intended for a mobile unit, the mobile switching center pages the mobile unit. When the mobile unit responds to the page, the mobile switching center can deliver the call to the mobile unit.

Currently, all mobile units in a mobile switching center area are required to register when they power up or power down, or when the transmitted location area ID changes. Mobile units are also required to register periodically with their serving mobile switching center. Currently, all mobile units register periodically at the same frequency or on the same time schedule. For example, all mobile units in a particular serving mobile switching center area may be required to register every 15 minutes. Additionally, all mobile units in a mobile switching center area are paged in the same paging area. For example, a mobile switching center may page a mobile unit at its last register cell or sector and in a fixed number of adjoining cells or sectors.

The current system of registration and paging does not recognize differences in usage patterns among individual mobile units. For example, some mobile units may be characterized as low termination units. A low termination unit may have only a few, or even no, peak time terminations in any given day. Still, according to the prior art, such low termination units are required to register just like every other mobile unit. Additionally, some mobile units may be characterized as low mobility units. Such units either do not move at all in the system, or they remain in a relatively small area within the system.

With the tremendous growth of users of wireless systems, registration, and particularly periodic registration places a tremendous burden on the control channels. It is an object of the present invention to tailor registration and paging to the usage patterns of specific mobile units.

SUMMARY OF THE INVENTION

The present invention provides a method of and system for dynamically managing the registration and paging for mobile units in a wireless system. The system of the present invention monitors a usage pattern, such as the number of terminations over a selected time period or mobility, for a mobile unit. Based upon the monitored usage pattern, the system will determine the proper balance between registration and paging for that mobile unit. If the monitored usage pattern indicates an excessively high amount of registration compared to the termination and mobility of the mobile unit, the mobile may be told to alter the registration algorithm to reduce the number of registrations, for example, by telling the mobile to register half as often as other mobiles or by telling the mobile to not register at all. If the monitored usage pattern indicates a low amount of registration compared to the termination and mobility of the mobile unit, the mobile may be told to alter the registration algorithm to increase the number of registrations, for example, by telling the mobile to register twice as often as other mobiles. This increased registration would allow for reduced paging for those mobiles. According to the present invention, low termination or low mobility mobiles may be required to register less frequently. High termination or high mobility mobile units may be required to register more frequently.

DESCRIPTION OF THE PREFERRED EMBODIMENT

Figure 1:
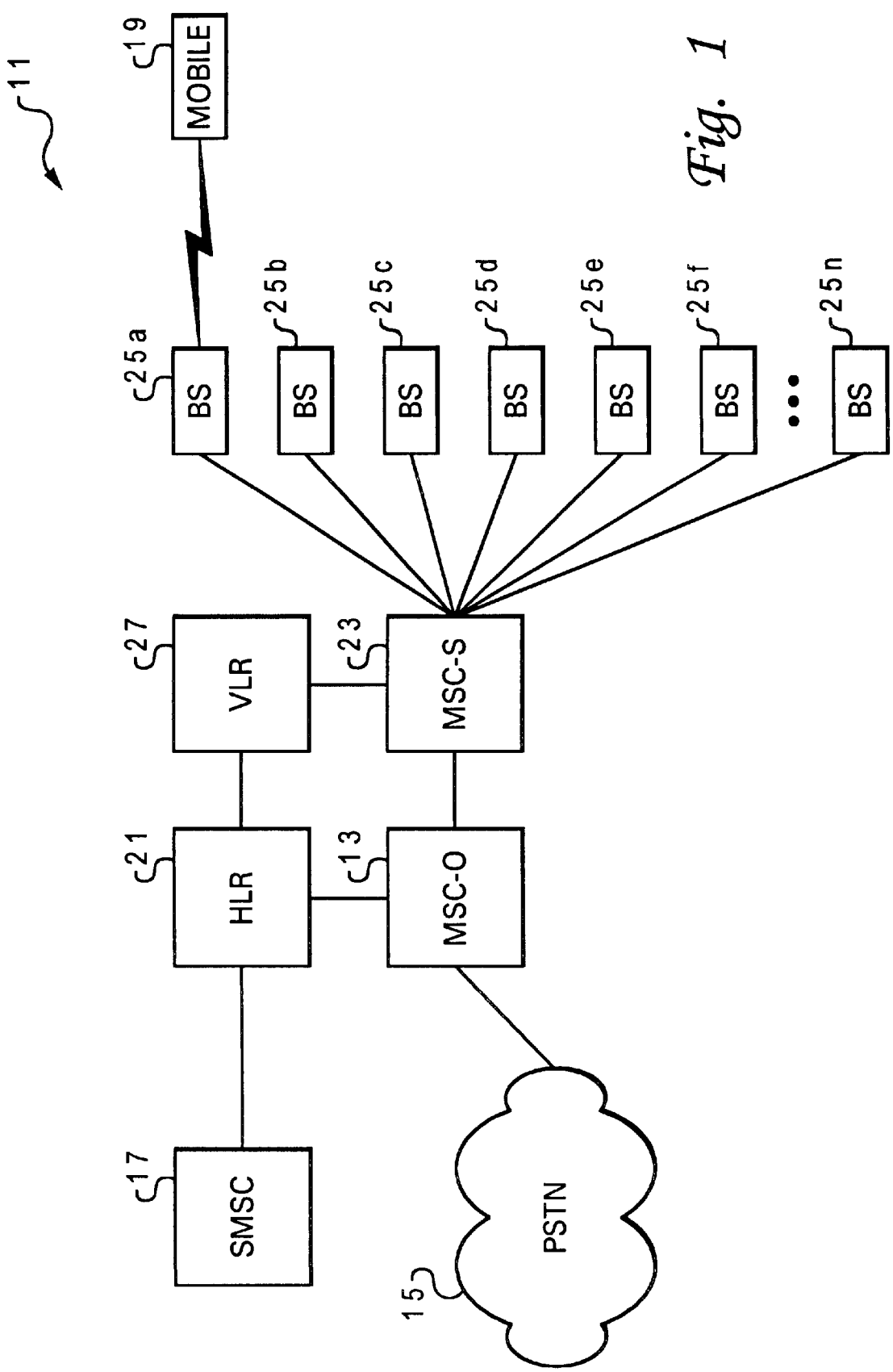
FIG. 1 is a block diagram of a wireless system according to the present invention.

Referring now to the drawings, and first FIG. 1, a wireless system is designated generally by 11. Wireless system 11 includes an originating mobile switching center (MSC-O) 13, which provides an interface between wireless system 11 and the public switched telephone network (PSTN), indicated generally at 15. Subscriber and location information for mobile units, such as mobile unit 19, is stored in a home location register (HLR) 21. When mobile unit 19 enters into, or powers on in, an area served by a serving mobile switching center (MSC-S) 23, mobile unit 19 registers with MSC-S 23. Mobile unit 19 registers with MSC-S 23 by sending a registration message over a control channel to a base station 25 for the cell or sector in which mobile unit 19 is located. When mobile unit 19 registers, MSC-S 23 transmits location information for mobile unit 19 to a visitor location register (VLR) 27. VLR 27 stores that information. When appropriate (e.g., for first time registrations, when the HLR requests, etc.), VLR 27 transmits the location information to HLR 21 and may ask HLR 21 to download subscriber information to VLR 27. A short message service center (SMSC) 17 is provided to send short messages to mobile unit 19.

After mobile unit 19 has registered with MSC-S 23, mobile unit 19 will be instructed to register periodically with MSC-S 23. This periodic registration enables MSC-S 23, along with location registers 21 and 27, to keep track of the location of mobile unit 19. Also, if mobile unit 19 fails to register on its periodic registration schedule, MSC-S 23 may assume that mobile unit 19 has powered down or moved out of the area. According to the prior art, all mobile units in a serving MSC are required to register periodically on a standard schedule.

Figure 2:
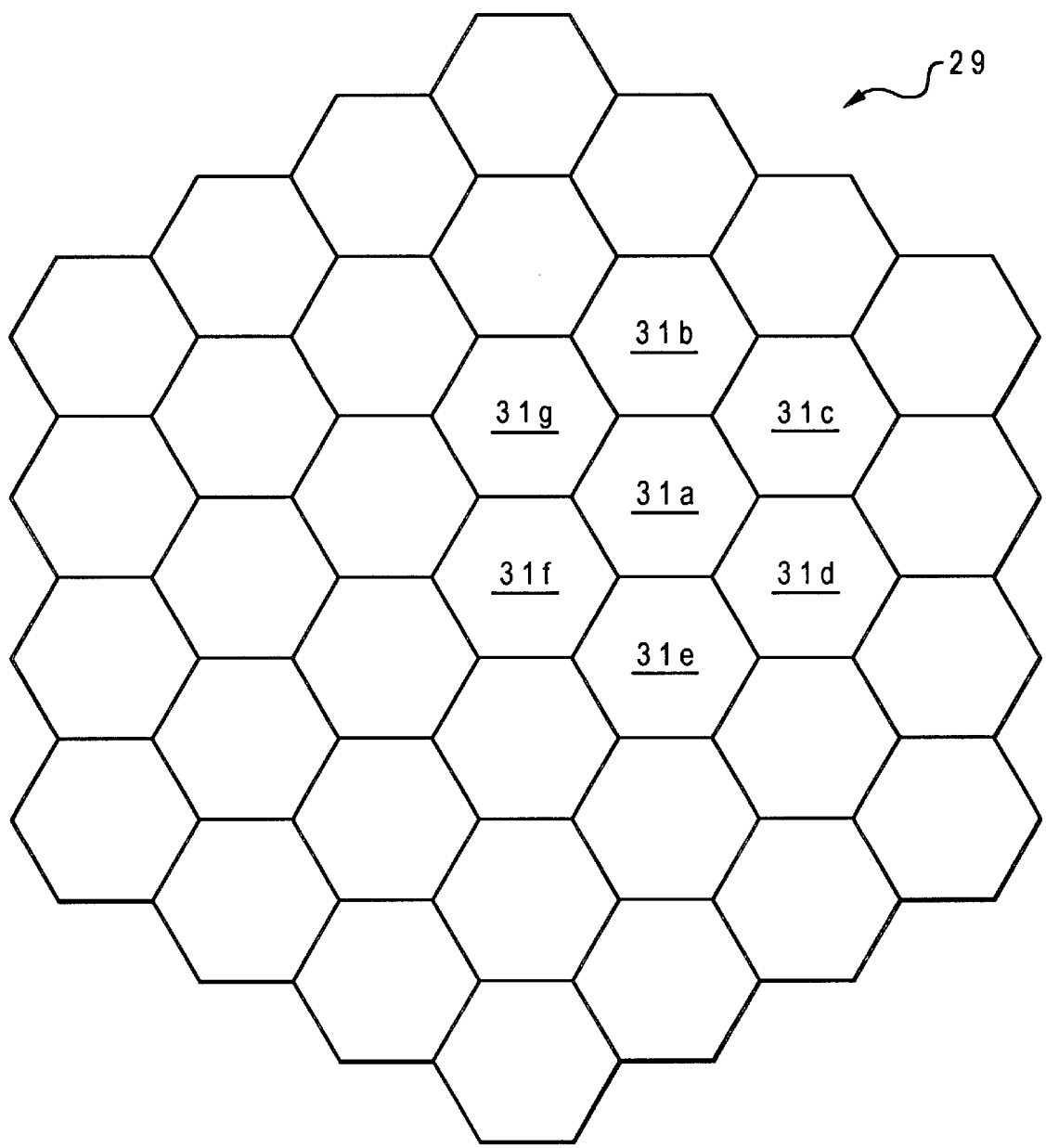
FIG. 2 is a plan of a mobile switch center area illustrating the control of paging areas according to the present invention.

The area served by MSC-S 23 is illustrated diagrammatically in FIG. 2 and designated generally by the numeral 29. Area 29 includes a plurality of cells or sectors 31 each served by a base station 25. If mobile unit 19 registers, for example, in cell 31a, which is served, for example, by base station 25a, that location is recorded in VLR 27. According to the prior art, if a call termination is received for mobile unit 19 at MSC-S 23, the system will page mobile unit 19 in a standard paging area that could include cell 31a and in a fixed number of adjoining cells, for example cells 31b–31c.

According to the present invention, and as will be explained in detail hereinafter, HLR 21 maintains usage pattern information for mobile unit 19. Usage pattern information may include, for example, the number of call terminations to mobile unit 19 over a selected time period, or the mobility of mobile unit 19. Periodically, according to present invention, HLR 21 makes an analysis of the usage pattern data for mobile 19, and determines if mobile unit 19 presents special usage patterns, such as low termination or low mobility. If HLR determines that mobile unit 19 presents special usage patterns, then HLR 21 implements an enhanced registration and paging plan for mobile unit 19. For example, if HLR 21 determines that mobile unit 19 is a low termination unit, which means that few or no call terminations are made to mobile unit 19, HLR 21 will provide that information to VLR 27 and MSC-S 23. According to the present invention, mobile unit 19 will be instructed, by means of a short message from SMSC 17 or the like, to make less frequent periodic registrations. For example, mobile unit 19 may be instructed not to make periodic registrations at all. Since mobile unit 19 is not required to make periodic registrations, when a call termination does arrive for mobile unit 19, unit 19 may not be located in the vicinity of the cell or sector where it originally registered. Accordingly, according to present invention, MSC-S 23 may page mobile unit 19 in each cell or sector 31 of area 29.

Additionally, according to the present invention, HLR 21 may analyze usage pattern data and determine that will unit 19 is a high termination unit. A high termination mobile unit is one that receives substantially more than an average number of terminations over a selected time period. According to the present invention, a high termination mobile unit may be instructed to register more frequently. For example, if the standard registration frequency is once every 15 minutes, a high termination unit may be instructed register at a frequency of once every five minutes, or perhaps the mobile will be told to register every time it changes control channel frequency. Since the system has more recent information with respect to the location of mobile unit 19, upon receipt of a call termination for mobile unit 19, MSC-S 23 can page mobile unit 19 in a smaller paging area. For example, if mobile unit 19 was last registered in cell or sector 31a, MSC-S 23 may page mobile unit 19 only in sector 31a.

HLR 21 may determine that mobile unit 19 does not move around substantially and is therefore of low mobility. According to the present invention, the system instructs mobile unit 19 to register at a lower periodic registration frequency. For very non-mobile units, the registration frequency can be reduced to zero. Also, since the location of a low mobility unit is generally well known, the paging area may be reduced according to the present invention to a single cell. Conversely, if HLR 21 determines that mobile unit 19 is a high mobility unit, mobile unit 19 may be instructed to register more frequently than the standard, and it may be paged in a larger paging area.

Figure 3:
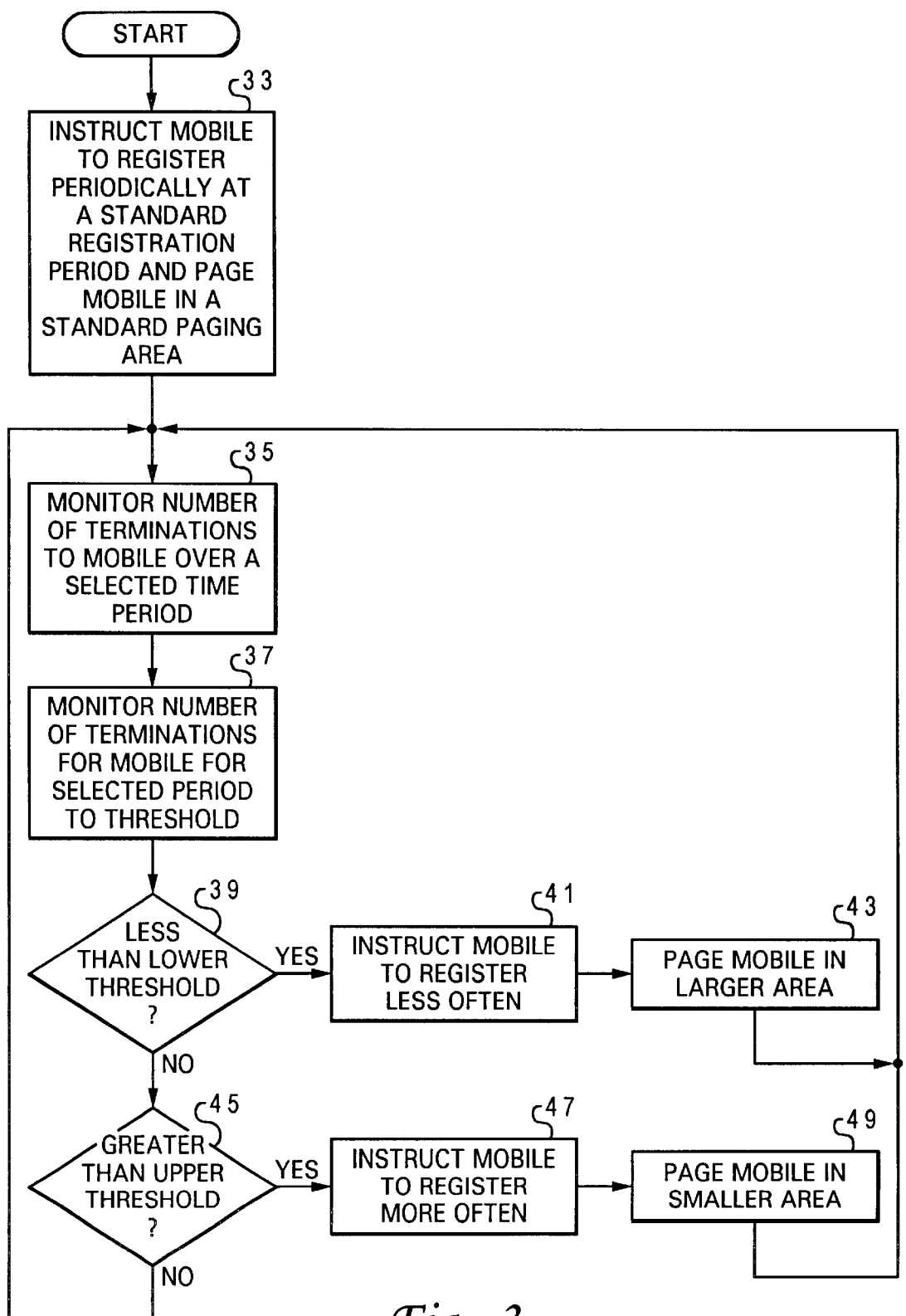
FIG. 3 is a flowchart of processing according to a preferred embodiment of the present invention.

Referring now to FIG. 3, there is shown flowchart illustrating one preferred embodiment of processing according to the present invention. Preferably, FIG. 3 processing is performed as a low priority background process. The system instructs the mobile unit to register periodically using the standard period from the control channel overhead message train, and instructs the MSC-S set the paging area is set at a standard area, at block 33. As explained with respect to FIGS. 1 and 2, the standard registration period may be once every 15 minutes, and the standard paging area may be the cell or sector in which the mobile unit last registered and the contiguous cells or sectors. Then, the home location register monitors the number of terminations to the mobile unit over a selected time period, at block 35.

Then, the HLR compares the number of terminations to mobile for the selected time period to preselected thresholds, at block 37. In the embodiment of FIG. 3, there are a lower termination threshold and an upper termination threshold. Mobile units with fewer terminations than the lower threshold may be characterized as low termination units. Conversely, units with more terminations than the upper threshold may be characterized as high termination units. The HLR tests, at decision block 39, if the number of terminations is less than the lower threshold. If so, the system implements an enhanced registration and paging plan, in which the HLR sends a short message service (SMS) message to the mobile unit instructing the mobile unit register less often, at block 41, and instructs the MSC-S is instructed to page the mobile unit in a larger paging area, as indicated at block 43.

If the number of terminations is not less than the lower threshold, the HLR tests, at decision block 45, if the number of terminations is greater than the upper threshold. If so, the system implements another enhanced registration and paging plan, in which the HLR sends a short message service (SMS) message to the mobile unit instructing the mobile unit register more often, at block 47, and instructs the MSC-S is instructed to page the mobile unit in a smaller paging area, as indicated at block 49.

From the foregoing, it may be seen that the present invention overcomes the shortcomings of the prior art. The present invention provides a customized paging and registration plan for each mobile unit based upon measured usage patterns. The present invention reduces the burden on the control channel caused by paging and registration.

The present invention has been illustrated and described with respect to presently preferred embodiments. Those skilled in the art will recognize alternative embodiments, given the benefit of the foregoing disclosure. For example, alternative criteria and algorithms may be used for determining usage patterns, and greater or lesser levels of granularity may be employed in implementing the present invention. Certain features of the invention may be used independently of other features. Accordingly, the foregoing disclosure is intended for purposes of illustration and not of limitation.

What is claimed is:

1. A method of managing mobile units in a wireless system, comprising the steps:

determining the number of terminations to a mobile unit over a selected period of time; and basing a registration plan for said mobile unit upon said determination of the number of terminations of said mobile unit, including:

reducing the frequency of periodic registration for said mobile unit if said number of terminations over said selected period of time is less than a lower threshold.

2. The method as claimed in claim 1, further comprising the step of defining a standard periodic registration frequency for said mobile unit.

3. The method as claimed in claim 2, wherein said step of basing said registration plan for said mobile unit includes the step of maintaining the frequency of periodic registration for said mobile unit at said standard frequency if said number of terminations is between said lower threshold and an upper threshold.

4. The method as claimed in claim 1, wherein said step of basing said registration plan for said mobile unit includes the step of increasing the frequency of periodic registration for said mobile unit if said number of terminations is greater than an upper threshold.

5. The method as claimed in claim 1, wherein said step of basing said periodic registration plan for said mobile unit further includes the step of maintaining the frequency of periodic registration for said mobile unit at a standard frequency if said number of terminations is greater than a threshold.

6. The method as claimed in claim 1, wherein said frequency of periodic registration is reduced to zero.

7. The method as claimed in claim 1, wherein said step of basing said periodic registration plan for said mobile unit further includes the step of maintaining the frequency of periodic registration for said mobile unit at a standard frequency if said number of terminations is less than a threshold.

8. The method as claimed in claim 7, wherein said step of basing said periodic registration plan for said mobile unit further includes the step of increasing the frequency of periodic registration for said mobile unit if said number of terminations is greater than said threshold.

9. The method as claimed in claim 1, further including determining the mobility of said mobile unit.

10. The method as claimed in claim 9, wherein said step of basing said registration plan for said mobile unit further includes the step of reducing the frequency of periodic registration based upon low mobility of said mobile unit.

11. The method as claimed in claim 9, further including the step of basing a paging area plan for said mobile unit upon said mobility of said mobile unit.

12. The method as claimed in claim 11, wherein said step of basing said paging area plan for said mobile unit further includes the step of reducing the paging area below a standard paging area based upon low mobility of said mobile unit.

13. A method of managing mobile units in a wireless system, comprising the steps of:

determining the number of terminations to a mobile unit over a selected period of time; and basing a paging area plan for said mobile unit upon said determination of the number of terminations of said mobile unit, including:

increasing the size of the paging area for said mobile unit if said number of terminations is less than a lower threshold.

14. The method as claimed in claim 13, further including the step of defining a standard paging area for said mobile unit.

15. The method as claimed in claim 13, wherein said step of basing said paging area plan for said mobile unit further includes the step of maintaining the paging area for said mobile unit at said standard paging area if said number of terminations is between said lower threshold and an upper threshold.

16. The method claimed in claim 13, wherein said step of basing said paging area plan for said mobile unit further includes the step of decreasing the size of said paging area for said mobile unit if said number of terminations is greater than an upper threshold.

* * * * *